Patented June 16, 1953

2,642,436

UNITED STATES PATENT OFFICE 2,642,436

4 - SUBSTITUTED - 2 - (TERTIARY-AMINO-ALKOXY) -BENZONITRILES AND THEIR PREPARATION

Raymond O. Clinton, North Greenbush, and Stanley C. Laskowski, Menands, N. Y., assignors to Sterling Drug Inc., New York, N. Y., a corporation of Delaware No Drawing. Application September 5, 1951, Serial No. 245,243

17 Claims. (Cl. 260—294.7)

This invention relates to 4-substituted-2-(tertiary - aminoalkoxy) - benzonitriles and to their preparation.

The compounds of our invention have the general formula

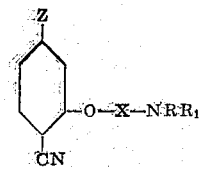

where Z is nitro, amino, lower alkylamino or lower hydroxyalkylamino, X is a lower alkylene radical and $NRR_1$ is a tertiary-amino radical. These nitriles, especially the compounds where Z is $NO_2$, have utility as intermediates, for instance, in the preparation of the corresponding quaternary salts which are disclosed and claimed in our copending application Serial No. 245,247, filed September 5, 1951. In addition, some of these 4 - substituted-2-(tertiary-aminoalkoxy) - benzonitriles have useful pharmacological properties, such as, local anesthetic activity and analgesic activity.

In the above general formula, the lower alkylene radical designated as X has preferably two to four carbon atoms and has its two free valence bonds on different carbon atoms. Thus, X includes such examples as $-CH_2CH_2$, $-CH_2CH_2CH_2-$ $-CH_2CH(CH_3)$, $-CH_2CH_2CH_2CH_2-$, $-CH_2CH(CH_3)CH_2-$ and the like. The tertiary-amino radical shown above as $NRR_1$ comprehends dialkylamino radicals where R and $R_1$ are lower alkyl groups, alike or different, and each alkyl group having one to six carbon atoms, such dialkylamino radicals including dimethylamino, diethylamino, ethylmethylamino, diisopropylamino, ethyl-n-propylamino, di-n-butylamino, di - n - hexylamino, and the like. Further, the tertiary-amino radical designated as $NRR_1$ encompasses saturated N-heteromonocyclic radicals having five to six ring atoms, illustrated by examples such as 1-piperidyl; (lower alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower alkylated)-1-pyrrolidyl such as 2-methyl-1-pyrrolidyl, 2,5-dimethyl-1-pyrrolidyl; 4-morpholinyl; and the like. In the above formula, when Z stands for lower alkylamino, the lower alkyl radical, designated as $R_2$ hereinbelow, has preferably one to six carbon atoms, including such radicals as methyl, ethyl, n-propy, n-butyl, isobutyl, n-amyl, 2-amyl, n-hexyl, and the like. When Z represents lower hydroxyalkylamino, the lower hydroxyalkyl radical, designated as $R_2$ hereinbelow, has preferably two to six carbon atoms, including radicals such as 2-hydroxyethyl, 2-hydroxypropyl, 3-hydroxypropyl, 3-hydroxy-2-methylpropyl, 3-hydroxy-2,2-dimethylpropyl, 2-hydroxybutyl, 4-hydroxybutyl, 3-hydroxyamyl, 5-hydroxyamyl, 6-hydroxyhexyl, and the like.

The compounds of our invention can be prepared preferably according to the procedure represented by the following series of equations where X, $NRR_1$ and $R_2$ have the meanings given hereinabove and halogen is chlorine, bromine, iodine or fluorine:

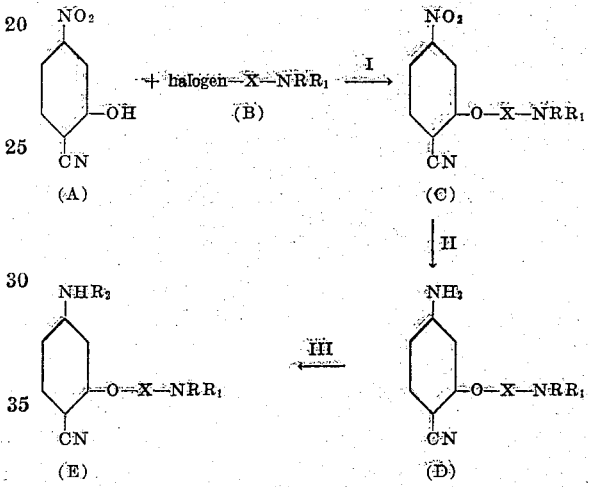

Thus, in Step I, 4-nitro-2-hydroxybenzonitrile (A) is converted into a 4-nitro-2-(tertiary-aminoalkoxy)benzonitrile (C) by reaction with a tertiaryaminoalkyl halide (B). In Step II, the 4 - nitro-2-(tertiary - aminoalkoxy)benzonitrile (C) is reduced to yield the corresponding 4-amino - 2 - (tertiary - aminoalkoxy)benzonitrile (D), which is then alkylated to form the corresponding 4-alkylamino- or 4-hydroxyalkylamino - 2 - (tertiary - aminoalkoxy)benzonitrile (E). A specific illustration of this series of reactions is the formation of 4-n-butylamino-2-(2-diethylaminoethoxy)benzonitrile by first reacting 4-nitro-2-hydroxybenzonitrile, preferably in the form of an alkali metal salt, with a 2-diethylaminoethyl halide, preferably the chloride, to yield 4-nitro-2-(2-diethylaminoethoxy)- benzonitrile, reducing this 4-nitro compound to yield the corresponding 4-amino-2-(2-diethylaminoethoxy)benzonitrile and then alkylating this 4-amino compound to produce 4-n-butylamino-2-(2-diethylaminoethoxy)benzonitrile.

Step I is carried out preferably using 4-nitro-2-hydroxybenzonitrile in the form of a metal salt thereof, preferably an alkali metal salt, with the tertiary-aminoalkyl halide. Alternatively, Step I can be carried out using 4-nitro-2-hydroxybenzonitrile itself, however, with a resulting decrease in yield of the 4-nitro-2-(tertiary-aminoalkoxy)benzonitrile.

The reduction Step II is carried out either by chemical methods or by catalytic hydrogenation. Suitable chemical reducing agents include iron and hydrochloric acid, ferrous sulfate and ammonia, tin and hydrochloric acid, sodium hydrosulfite, etc. In practicing our invention, we preferably used iron and hydrochlric acid. Catalysts suitable when catalytic hydrogenation is employed include Raney nickel, platinum, palladium or other catalysts generally effective to catalyze hydrogenation of nitro groups to amino groups.

The alkylation of the 4-amino-2-(tertiary-aminoalkoxy)benzonitriles (D) to produce the related 4-alkylamino- or 4-hydroxyalkylamino-nitriles (Step III) where $R_2$ has from three to six carbon atoms is preferably carried out by reductively alkylating the 4-amino compound with an alkanal or a hydroxyalkanal. Thus, this preferred method of alkylating the 4-amino nitriles (D) is by treating a mixture of a 4-amino-2-(tertiary-aminoalkoxy)-benzonitrile and an alkanal or hydroxyalkanal, having from three to six carbon atoms, in a reducing medium. This reduction can be carried out either by chemical methods or by catalytic hydrogenation. Illustrative of this reduction step is the formation of 4-n-amylamino-2-[3-(1-piperidyl)propoxy]-benzonitrile or 4-(5-hydroxyamylamino)-2-[3-(1-piperidyl)propoxy]benzonitrile by treating a mixture of the corresponding 4-amino-2-[3-(1-piperidyl)propoxy]-benzonitrile with pentanal (valeraldehyde) or 5-hydroxypentanal, respectively, with chemical reducing agents, such as zinc dust and acetic acid, iron and acetic acid, iron and hydrochloric acid, etc., or with hydrogen under pressure using catalysts such as platinum, palladium, Raney nickel or other catalysts generally effective in reductive alkylations using alkanals and hydroxyalkanals.

Alternatively, the alkylation Step III can be carried out directly by heating a 4-amino-2-(tertiary-aminoalkoxy)benzonitrile (D) with an alkylating agent such as methyl iodide, ethyl bromide, n-propyl bromide, isobutyl iodide, 2-hydroxyethyl bromide, 4-hydroxybutyl chloride, and the like, in the presence of a hydrogen halide acceptor, e. g., sodium bicarbonate, potassium carbonate, etc. Thus, such treatment of 4-amino - 2 - (3 - diethylaminopropoxy)benzonitrile with metehyl iodide, ethyl bromide or 2-hydroxyethyl bromide yields, respectively, 4-methylamino - 2 - (3 - diethylaminopropoxy)-benzonitrile, 4-ethylamine-2-(3-diethylaminopropoxy)benzonitrile or 4-(2-hydroxyethyl)-amino - 2 - (3 - diethylaminopropoxy)benzonitrile. Yields of the resulting 4-alklamino- and 4-hydroxyalkylamino-2-(tertiary-aminoalkoxy)benzonitriles obtained by this method are lower than those obtained by the foregoing described reductive alkylation procedure due to quaternary salt formation.

Step I can also be carried out stepwise, that is, by first haloalklating 4-nitro-2-hydroxybenzonitrile (A) to form a 4-nitro-2-(haloalkoxy)benzonitrile which is then treated with a secondary amine having the formula $HNRR_1$. The first step can be accomplished by treating 4-nitro-2-hydroxybenzonitrile or a metal salt thereof with a haloalklating agent such as a haloalkyl para-toluenesulfonate, haloalkyl benzenesulfonate, dihaloalkane, etc. As illustrations of this stepwise procedure, 4-nitro-2-hydroxybenzonitrile is haloalkylated by treating its sodium salt with 2-chloroethyl para-toluenesulfonate to form 4-nitro-2-(2-chloroethoxy)-benzonitrile which then is treated with diethylamine or piperidine to form 4-nitro-2-(2-diethylaminoethoxy)benzonitrile or 4-nitro-2-[2-(1-piperidyl)-ethoxy]benzonitrile, respectively.

Another method of preparing the 4-nitro-2-(tertiary-aminoalkoxy)benzonitriles (C) of our invention except those where the tertiary-amino radical $NRR_1$ is dimethylamino is afforded by a rearrangement process by heating a tertiary-aminoalkyl 6-nitrobenzisoxazole-3-carboxylate or, alternatively, by heating a mixture of a lower alkyl 6-nitrobenzisoxazole-3-carboxylate with a tertiary-aminoalkanol which results in formation of the tertiary-aminoalkyl 6-nitrobenzisoxazole-3-carboxylate which then undergoes said rearrangement. This rearrangement process is disclosed and claimed in our copending application Serial No. 245,250, filed September 5, 1951, now United States Patent 2,626,261, issued January 20, 1953. The tertiary-amino-alkyl 6-nitrobenzisoxazole-3-carboxylates are also disclosed and are claimed in our copending application Serial No. 245,245, filed September 5, 1951, now United States Patent 2,626,260, issued January 20, 1953.

The 4-substituted-2-(tertiary-aminoalkoxy)-benzonitriles of our invention are therapeutically active or useful as intermediates whether employed in the form of their free bases or in the form of their salts with relatively non-toxic organic or inorganic acids. In practicing our invention, we found it convenient to isolate our compounds in the form of their hydrochlorides or phosphates. However, other acid addition salts are within the scope of our invention. Such salts include the hydrobromides, sulfates, citrates, sulfamates, tartrates, succinates, acetates, benzoates, oleates, and the like.

Specific embodiments of our invention are illustrated by the following examples.

*(1) 4-nitro-2-(tertiary-aminoalkoxy)benzonitriles*

Preparation of the 4-nitro-2-(tertiary-aminoalkoxy)benzonitriles of our invention is illustrated by the following alternative procedures, all of which involve alkylation of 4-nitro-2-hydroxybenzonitrile or a metal salt thereof with a tertiary-aminoalkyl halide or, stepwise, with a haloalkylating agent such as a haloalkyl para-toluenesulfonate to produce a 4-nitro-2-(haloalkoxy)benzonitrile which is then treated with a secondary amine to form the desired 4-nitro-2-(tertiary-aminoalkoxy)benzonitriles.

*Procedure (a)*.—To a warm solution of 82.0 g. of 4-nitro-2-hydroxybenzonitrile and 1000 ml. of absolute ethanol was added a solution of 11.5 g. of sodium in 500 ml. of absolute ethanol. To the resulting deep carmine-colored solution was added 74.5 g. of 2-diethylaminoethyl chloride (the distilled free base can be conveniently replaced by the equivalent amount of 2-diethylaminoethyl chloride hydrochloride and an additional equivalent of sodium ethoxide), the mixture was refluxed with stirring for five hours, filtered while hot, and the filter-cake was washed thoroughly with absolute ethanol. The combined filtrates were evaporated in vacuo, the residue was dissolved in ethyl acetate and the solution was filtered. To the filtrate was added an excess of 20% ethereal hydrogen chloride solution. The resulting precipitate of 4-nitro-2-(2 - diethylaminoethoxy)benzonitrile hydrochloride was collected and recrystallized several times from absolute ethanol-ether. The yield of purified material was 112.0 g. (85%), M. P. 193.2–194.6° C. (cor.).

*Anal.*—Calcd. for $C_{13}H_{17}N_3O_3 \cdot HCl$: Cl, 11.83; $N_D$, 14.02. Found: Cl. 11.75; $N_D$, 14.02.

$N_D$ stands for total nitrogen as determined by the Dumas method.

Conversion of the above hydrochloride into the corresponding base was accomplished by dissolving the hydrochloride in water and precipitating the base by addition of solid potassium carbonate. The precipitated base, 4-nitro-2-(2-diethylaminoethoxy)benzonitrile, which was obtained in 97% yield from the hydrochloride, crystallized from n-heptane in large, pale yellow leaflets, m.p. 104.5–105.5° C. (cor.).

*Anal.*—Calcd. for $C_{13}H_{17}N_3O_3$: C, 59.30; H, 6.51; $N_{BA}$, 5.32; $N_{NO_2}$, 5.32. Found: C, 59.43; H, 6.58; $N_{BA}$, 5.28; $N_{NO_2}$, 5.00.

$N_{BA}$ stands for basic amino nitrogen as determined by titration with perchloric acid in glacial acetic acid solution.

$N_{NO_2}$ stands for nitro nitrogen as determined by titration with standard titanous chloride in glacial acetic acid solution.

When a 3-(tertiary-amino)propyl chloride was substituted in the above procedure for 2-diethylaminoethyl chloride, there was added 6 g. of sodium iodide per mole of chloride base and the refluxed period was increased to twenty hours. The yields of purified 4-nitro-2-[3-(tertiary-amino)propoxy]benzonitriles, which are given below in Table I', varied from 65 to 90%.

The substitution of 2-dimethylaminoethyl chloride for 2-diethylaminoethyl chloride in the above procedure gave none of the desired product. Instead, cyclization of the 2-dimethylaminoethyl chloride occurred exclusively, and a high yield of 1,1,4,4-tetramethylpiperazinium di-(2-cyano-5-nitrophenolate) was isolated, m. p. 212.4–213.3° C. (cor.) with decomposition. However, 2-dimethylaminoethyl chloride can be used successfully in this alkylation by using a nonpolar solvent, such as benzene or toluene, in place of the polar solvent, ethanol, as described below in Procedure (b).

1-Dimethylamino-2-propyl chloride gave a mixture of products indicating that partial cyclization of the basic chloride had occurred. The ethanolic filtrate from the reaction (carried out as above) was evaporated in vacuo. The residual red oil was triturated with warm ethyl acetate and the insoluble red precipitate was removed by filtration. The ethyl acetate solution was decolorized and treated with an excess of ethereal hydrogen chloride. The resulting crystalline hydrochloride was collected, washed with ethyl acetate and reconverted to the base; the crystalline base as initially obtained melted at 56–59° C. Several recrystallizations from n-heptane and from dilute ethanol gave cream-colored leaflets, m. p. 75.6–77.0° C. (cor.). This compound is either 4-nitro-2-(2-dimethylamino-1-propoxy)benzonitrile (F) or 4-nitro-2-(3-dimethylamino-2-propoxy)benzonitrile (G) having the following respective formulas

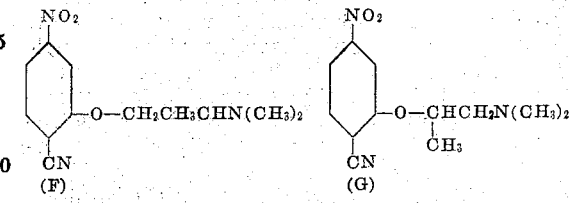

*Anal.*—Calcd. for $C_{12}H_{15}N_3O_3$: $N_{NO_2}$, 5.62; $N_{BA}$, 5.62. Found: $N_{NO_2}$, 5.60; $N_{BA}$, 5.58.

The hydrochloride of this basic nitrile (F or G) formed pale yellow prisms from ethanol, m.p. 212.1–212.7° C. (cor.).

*Anal.*—Calcd. for $C_{12}H_{15}N_3O_3 \cdot HCl$: $N_{NO_2}$, 4.90; Cl, 12.41. Found: $N_{NO_2}$ 5.04; Cl, 12.39.

The ethyl acetate insoluble red precipitate, obtained above, was recrystallized several times from absolute ethanol-n-hexane or from isopropanol containing water. The compound crystallized in clusters of slender red needles from the former solvent combination and in large thin rectangular orange plates from the latter solvent. The orange form (a hydrate) was converted into the anhydrous red form on heating at 100° C. Quantitative degradation experiments indicated that this compound was 1,1,2,4,4,5-hexamethylpiperazinium di-(2-cyano-5-nitrophenolate).

*Procedure (b).*—A mixture of 82.0 g. of 4-nitro-2-hydroxybenzonitrile, 70.3 g. of powdered anhydrous potassium carbonate and 2500 ml. of toluene was refluxed with stirring under a continuous water separator for three hours. During this period 4.5 ml. of water was collected. The continuous water separator was removed and there was added 54.0 g. of 2-dimethylaminoethyl chloride. The mixture was refluxed with stirring for sixteen hours, treated with an additional 10.8 g. of 2-dimethylaminoethyl chloride and refluxed with stirring for an additional eight hours. The mixture was filtered while hot, the insoluble material was washed with hot toluene, and the combined filtrates were decolorized and evaporated in vacuo. The resulting solid was recrystallized several times from n-heptane, yielding 77.1 g. (65.%) of purified 4-nitro-2-(2-dimethylaminoethoxy)benzonitrile, m. p. 83.1–84.0° C. (cor.).

*Anal.*—Calcd. for $C_{11}H_{13}N_3O_3$: $N_{BA}$, 5.95; $N_{NO_2}$, 5.95. Found: $N_{BA}$, 5.98; $N_{NO_2}$, 6.25.

4 - Nitro - 2 - (2 - dimenthylaminoethoxy) - benzonitrile in the form of its hydrochloride salt melts at 229.5–230.3° C. (cor.).

*Anal.*—Calcd. for $C_{11}H_{13}N_3O_3$; Cl, 13.05; $N_{NO_2}$, 5.16. Found: Cl, 12.79; $N_{NO_2}$, 5.28.

*Procedure (c).*—A mixture of 82.0 g. of 4-nitro-2-hydroxybenzonitrile, 76.0 g. of powdered anhydrous potassium carbonate, 141.0 g. of 2-chloroethyl para-toluenesulfonate and 1350 ml. of meta-xylene was refluxed with stirring under a continuous water separator for seventy-eight hours. The mixture was filtered while hot and the insoluble material was washed thoroughly with hot toluene. The combined filtrates were concentrated to dryness in vacuo and the residual solid was recrystallized from absolute ethanol. There was thus obtained a 67.5% yield of purified 4-nitro-2-(2-chloroethoxy)benzonitrile, as slender, pale yellow needles, m. p. 127.4–128.5° C. (cor.).

*Anal.*—Calcd. for $C_9H_7ClN_2O_3$: $N_{NO_2}$, 6.18; Cl, 15.65. Found: $N_{NO_2}$, 6.30; Cl, 15.30.

The reaction of 4-nitro-2-(2-chloroethoxy)-benzonitrile with a secondary amine in aqueous-ethanolic solution containing sodium iodide gave fair to poor yields of the corresponding 4-nitro-2-(tertiary-aminoethoxy)benzonitriles, given below in Table I'. Thus, reaction with dimethylamine, diethylamine or piperidine gave 4-nitro-2-(2-dimethylaminoethoxy)benzonitrile, 4-nitro-2-(2-diethylaminoethoxy)benzonitrile or 4-nitro-2-[2-(1-piperidyl)ethoxy]benzonitrile, respectively.

*Procedure (d).*—A solution of 16.4 g. of 4-nitro-2-hydroxybenzonitrile and 14.2 g. of 2-diethylaminoethyl chloride in 150 ml. of anhydrous isopropanol was refluxed for five hours. On working up there was obtained 8.5 g. (28% yield) of 4-nitro-2-(2-diethylaminoethoxy) benzonitrile hydrochloride, m. p. and mixed m. p. 193–194° C. (cor.).

*Procedure (e).*—A solution of 6.2 g. of 6-nitrobenzisoxazole-3-carboxylic acid and 5.4 g. of 2-diethylaminoethyl chloride in 100 ml. of anhydrous isopropanol was refluxed for one hour. During initial dissolution of the acid in the alcohol-amine mixture an orange color developed and carbon dioxide was vigorously evolved. On working up there was obtained 5.2 g. (58% yield) of purified 4-nitro-2-(2-diethylaminoethoxy)benzonitrile hydrochloride, m. p. and mixed m. p. 193.2–194.6° C. (cor.).

*Anal.*—Calcd. for $C_{13}H_{17}N_3O_3 \cdot HCl$: C, 52.09; H, 6.05; $N_D$, 14.02; $N_{NO_2}$, 4.67; Cl, 11.83. Found: C, 52.29; H, 5.91; $N_D$, 14.07; $N_{NO_2}$, 4.55; Cl, 11.79.

The foregoing process as illustrated by Procedure (e) is disclosed and claimed in our copending application Serial Number 245,250, filed September 5, 1951, now United States Patent 2,626,261, issued January 20, 1953.

Additional 4-nitro-2-(tertiary-aminoalkoxy)-benzonitriles prepared according to the above described procedures are given in Table I'.

TABLE I'

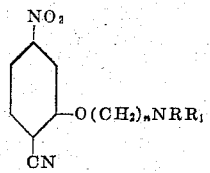

| n | NRR₁ | M. P., °C. (cor.) | Formula | Analyses, Percent | | | |
|---|---|---|---|---|---|---|---|
| | | | | $N_{BA}$ | | $N_{NO_2}$ | |
| | | | | Calcd. | Found | Calcd. | Found |
| 3 | $N(C_2H_5)_2$ | 53.6–55.0 | $C_{14}H_{19}N_3O_3$ | 5.05 | 5.04 | 5.05 | 4.92 |
| 2 | $NC_5H_{10}$ a | 118.1–119.2 | $C_{14}H_{17}N_3O_3$ | 5.09 | 5.07 | 5.09 | 5.05 |
| 2 | $NC_6H_{12}$ b | 133.4–136.2 | $C_{15}H_{19}N_3O_3$ | c4.48 | 4.82 | d14.52 | d14.24 |
| 2 | $NC_7H_{14}$ e | 132.9–133.8 | $C_{16}H_{21}N_3O_3$ | 4.62 | 4.65 | 4.62 | 4.76 |
| 3 | $NC_5H_{10}$ a | 102.2–102.8 | $C_{15}H_{19}N_3O_3$ | 4.84 | 4.87 | 4.84 | 4.80 |
| 3 | $NC_6H_{12}$ b | 92.5–93.5 | $C_{16}H_{21}N_3O_3$ | 4.62 | 4.64 | 4.62 | 4.70 |
| 2 | $NC_4H_8O$ f | 126.5–127.5 | $C_{13}H_{15}N_3O_4$ | 5.05 | 5.07 | 5.05 | 5.05 |
| 3 | $NC_4H_8O$ f | 110.0–111.5 | $C_{14}H_{17}N_3O_4$ | 4.81 | 4.82 | 4.81 | 4.80 | a $NC_5H_{10}$=1-piperidyl.
b $NC_6H_{12}$=2-methyl-1-piperidyl.
c Calcd.: C, 62.26; H, 6.62. Found: C, 62.38; H, 6.53.
d Total nitrogen by the Dumas method ($N_D$).
e $NC_7H_{14}$=2,6-dimethyl-1-piperidyl.
f $NC_4H_8O$=4-morpholinyl.

Hydrochloride addition salts of the compounds of Table I' are given in Table II'.

TABLE II'

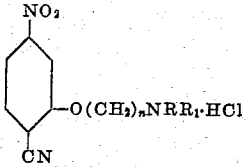

| n | NRR₁ | M. P., °C. (cor.) | Formula | Analyses, Percent | | | |
|---|---|---|---|---|---|---|---|
| | | | | Cl | | $N_{NO_2}$ | |
| | | | | Calcd. | Found | Calcd. | Found |
| 3 | $N(C_2H_5)_2$ | 210.2–210.9 | $C_{14}H_{19}N_3O_3 \cdot HCl$ | 11.30 | 11.30 | 4.46 | 4.58 |
| 2 | $NC_5H_{10}$ a | (b) | $C_{14}H_{17}N_3O_3 \cdot HCl$ | 11.37 | 11.33 | 4.49 | 4.64 |
| 2 | $NC_6H_{12}$ c | 192.7–193.7 | $C_{15}H_{19}N_3O_3 \cdot HCl$ | 10.88 | 10.80 | d12.90 | d13.04 |
| 2 | $NC_7H_{14}$ e | 214.6–215.3 | $C_{16}H_{21}N_3O_3 \cdot HCl$ | 10.43 | 10.30 | 4.12 | 4.26 |
| 3 | $NC_5H_{10}$ a | 194.0–194.9 | $C_{15}H_{19}N_3O_3 \cdot HCl$ | 10.88 | 10.83 | 4.30 | 4.30 |
| 3 | $NC_6H_{12}$ c | 187.1–188.0 | $C_{16}H_{21}N_3O_3 \cdot HCl$ | 10.43 | 10.27 | d12.37 | d12.12 |
| 2 | $NC_4H_8O$ f | 214.6–215.5 | $C_{13}H_{15}N_3O_4 \cdot HCl$ | 11.30 | 11.31 | 4.47 | 4.35 |
| 3 | $NC_4H_8O$ f | 215.0–215.8 | $C_{14}H_{17}N_3O_4 \cdot HCl$ | 10.82 | 10.85 | 4.27 | 4.19 | a $NC_5H_{10}$=1-piperidyl.
b Sintered at 197° C., slowly decomposed and turned black above 199° C.
c $NC_6H_{12}$=2-methyl-1-piperidyl.
d Total nitrogen by the Dumas method ($N_D$).
e $NC_7H_{14}$=2,6-dimethyl-1-piperidyl.
f $NC_4H_8O$=4-morpholinyl.

Additional 4-nitro-2-(tertiary-aminoalkoxy)-benzonitriles which can be prepared according to the foregoing procedures include the following: 4 - nitro - 2 - [3 - (1 - pyrrolidyl) propoxy]benzonitrile; 4 - nitro - 2 - [2 - (2,5 - dimethylpyrrolidyl) ethoxy]benzonitrile; 4 - nitro - 2 - (4 - dimethylaminobutoxy) benzonitrile; 4 - nitro - 2 - [2 - (di-n-butylamino) ethoxy]benzonitrile; 4 - nitro - 2 - [3 - (4 - methyl - 1 - piperidyl) propoxy]benzonitrile; 4 - nitro - 2 - [2 - (3 - ethyl - 1 - piperidyl) ethoxy]benzonitrile; 4 - nitro - 2 - [3 - (2 - methyl - 1 - pyrrolidyl) propoxy]benzonitrile; and the like.

(2) 4-amino-2-(tertiary-aminoalkoxy)-benzonitriles

These compounds were prepared by reduction of the corresponding 4-nitro-2-(tertiary-aminoalkoxy)benzonitriles, as described hereinabove. Illustrative of this reduction are the following examples.

To a hot vigorously stirred mixture of 64.5 g. of powdered iron, 1 ml. of concentrated hydrochloric acid and 250 ml. of 50% aqueous ethanol was added slowly over a period of about ten minutes 57.4 g. of 4-nitro-2-(2-diethylaminoethoxy)-benzonitrile hydrochloride. The resultant mixture was heated with stirring for another thirty minutes, after which time an excess of solid sodium bicarbonate was carefully added. The mixture was stirred for an additional ten minutes and then filtered through a filter aid which was subsequently washed with hot ethanol. The combined filtrate and washings were concentrated by distilling in vacuo, thereby yielding, as an oil, the product, 4-amino-2-(2-diethylaminoethoxy)-benzonitrile.

Alternatively, the foregoing preparation can be carried out using 4-nitro-2-(2-diethylaminoethoxy)benzonitrile in place of 4-nitro-2-(2-diethylaminoethoxy)benzonitrile hydrochloride.

The phosphate salt of the above 4-amino nitrile was prepared by dissolving about 12 g. of 4-amino-2-(2-diethylaminoethoxy) benzonitrile in 100 ml. of hot isopropanol, adding to this solution a solution of 6 g. of 85% phosphoric acid in 50 ml. of hot isopropanol and chilling the resulting mixture. The separated product was filtered, washed with isopropanol and recrystallized several times by dissolving it in a small amount of water, filtering the aqueous solution and diluting the filtrate with acetone. There was thus obtained as white prisms, 4-amino-2-(2-diethylaminoethoxy)benzonitrile phosphate, M. P. 213.5–214.5° C. (cor.) [after drying at 100° C. and 0.01 mm.].

*Anal.*—Calcd. for $C_{13}H_{19}N_3O \cdot H_3PO_4$: $H_3PO_4$, 29.59; $N_D$, 12.68. Found: $H_3PO_4$, 29.70; $N_D$, 12.52.

Alternatively, the dihydrochloride salt was prepared by treating a solution of 20 g. of 4-amino nitrile in 300 ml. of isopropanol with an excess of anhydrous ether containing 20% by weight of anhydrous hydrogen chloride and diluting the mixture with ether. The thick, pale yellow oil that precipitated was separated by decanting the solvent mixture and was taken up in 400 ml. of boiling isopropanol and precipitated by the addition of 300 ml. of ethyl acetate, followed by cooling. The product was filtered and recrystallized several times from isopropanol-ethyl acetate. There was thus obtained 4-amino-2-(2-diethylaminoethoxy)benzonitrile dihydrochloride.

The above reduction of the 4-nitro-2-(tertiary-aminoalkoxy)benzonitriles to yield the corresponding 4-amino nitriles can be carried out by catalytic hydrogenation as illustrated by the following general preparation: Ten grams of the 4-nitro-2-(tertiary-aminoalkoxy)benzonitrile in 150 ml. of ethanol is hydrogenated using 50 lbs. pressure of hydrogen at 25° C. in the presence of 2 g. of Raney nickel. After the rapid exothermic reaction, the catalyst is filtered off and the filtrate evaporated to dryness. The resulting residue is dissolved in ethyl acetate and ethereal hydrogen chloride is added as above. Alternatively, other catalysts can be employed as exemplified in the following use of platinum: Fifteen grams of a 4-nitro-2-(tertiary-aminoalkoxy)benzonitrile in 150 ml. of ethanol is reduced at 25 lbs. pressure of hydrogen at 25° C. in the presence of 200 mg. of platinum oxide monohydrate and 5 ml. of concentrated hydrochloric acid. After the rapid exothermic reaction, the catalyst is filtered off and the filtrate distilled in vacuo to remove the alcohol. The residue is taken up in water and potassium carbonate is added to the resulting solution to liberate the 4-amino-2-(tertiary-aminoalkoxy)benzonitrile, which is extracted with ethyl acetate. The ethyl acetate extract is dried and treated with phosphoric acid, as above, to give the 4-amino-2-(tertiary-aminoalkoxy)benzonitrile in the form of its phosphate.

When the procedure given above for the reduction of 4-nitro-2-(2-diethylaminoethyl)benzonitrile was followed but using 72.5 g. of 4-nitro-2-[2 - (4 - morpholinyl)ethoxy]benzonitrile hydrochloride, 80 g. of powdered iron, 1 ml. of concentrated hydrochloric acid, 300 ml. of ethanol and 50 ml. of water, there was obtained as the product, 4-amino-2-[2-(4-morpholinyl)ethoxy]-benzonitrile, which recrystallized from benzene as rosettes of long flat white needles, M. P. 130.6–132.8° C. (cor.), [dried at 80° C. in a vacuum oven for six hours].

*Anal.*—Calcd. for $C_{13}H_{17}N_3O_2$: $N_D$, 17.00. Found: $N_D$, 17.09.

The preparation of this 4-amino nitrile in the form of its monohydrochloride salt was accomplished as follows: To a solution of 5 g. of 4-amino-2-[2-(4-morpholinyl)ethoxy]benzonitrile dissolved in 100 ml. of warm ethyl acetate was added an excess of ethereal hydrogen chloride, thereby yielding an amorphous white precipitate. The precipitate was filtered, washed well with ethyl acetate and recrystallized by dissolving it in a minimum quantity of hot absolute ethanol and then adding to this hot solution about two volumes of ethyl acetate. The precipitated dihydrochloride was collected, washed with ethyl acetate and dissolved in 100 ml. of hot ethanol. To this solution was added 6 g. of 4-amino-2-[2-(4-morpholinyl)ethoxy]benzonitrile and the solution was heated until dissolution of the 4-amino nitrile was complete. The resulting solution was cooled, and then diluted to about 1 liter with 1:1 ethyl acetate-ether. The gummy material that separated was boiled with absolute ethanol and the hot mixture treated with 2 volumes of ethyl acetate. On cooling, there separated a crystalline precipitate which was collected and recrystallized once from ethanol-ethyl acetate and once from absolute ethanol, thereby yielding, as large transparent prisms, 4-amino-2-[2-(4-morpholinyl) - ethoxy]benzonitrile monohydrochloride, M. P. 222.2–223.5° C. (cor.), dried at 100° C. in vacuo for six hours].

*Anal.*—Calcd. for $C_{13}H_{17}N_3O_2 \cdot HCl$: $N_D$, 14.81; Cl, 12.49. Found: $N_D$, 14.77; Cl, 12.21.

The compound obtained above by reacting the sodium salt of 4-nitro-2-hydroxybenzonitrile with 1-dimethylamino-2-propyl chloride, on treatment with a reducing agent according to the foregoing procedures yields a compound that is either 4 - amino - 2 - (2-dimethylamino-1-propoxy)benzonitrile (H) or 4-amino-2-(3-dimethylamino-2-propoxy)benzonitrile (I) having the following respective formulas

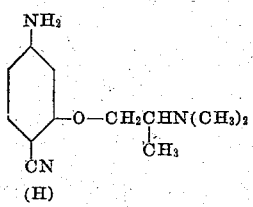 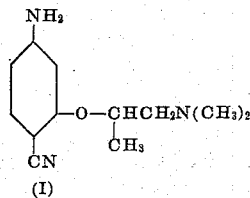

(H)                           (I)

Additional 4-amino-2-(tertiary-aminoalkoxy)benzonitriles prepared according to the above procedures are given in Table III'.

TABLE III'

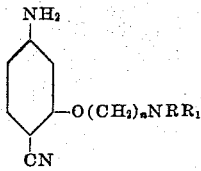

| $n$ | $NRR_1$ | M. P., °C. (cor.) | Formula | $N_D$, Calcd. | $N_D$, Found |
|---|---|---|---|---|---|
| 3 | $N(C_2H_5)_2$ | 96.0–96.6 | $C_{14}H_{21}N_3O$ | 17.00 | 16.91 |
| 2 | $NC_5H_{10}$ [a] | oil | $C_{14}H_{19}N_3O$ | | |
| 2 | $NC_6H_{12}$ [b] | oil | $C_{15}H_{21}N_3O$ | | |
| 2 | $NC_7H_{14}$ [c] | 96.2–96.8 | $C_{16}H_{23}N_3O$ | [d] 10.25 | [d] 10.02 |
| 3 | $NC_5H_{10}$ [a] | 125.6–126.9 | $C_{15}H_{21}N_3O$ | 16.20 | 16.28 |
| 3 | $NC_6H_{12}$ [b] | 111.8–113.4 | $C_{16}H_{23}N_3O$ | [d] 10.25 | [d] 9.97 |
| 3 | $NC_4H_8O$ [e] | 90.4–91.4 | $C_{14}H_{19}N_3O_2$ | 16.08 | 15.96 |

[a] $NC_5H_{10}$ = 1-piperidyl.
[b] $NC_6H_{12}$ = 2-methyl-1-piperidyl.
[c] $NC_7H_{14}$ = 2,6-dimethyl-1-piperidyl.
[d] Basic amino nitrogen as determined by titration with perchloric acid in glacial acetic acid solution.
[e] $NC_4H_8O$ = 4-morpholinyl.

Phosphoric acid addition salts of the compounds of Table III' are given in Table IV'.

TABLE IV'

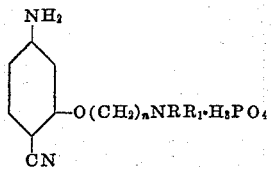

| $n$ | $NRR_1$ | M. P., °C. (cor.) | Formula | $H_3PO_4$ Calcd. | $H_3PO_4$ Found | $N_D$ Calcd. | $N_D$ Found |
|---|---|---|---|---|---|---|---|
| 3 | $N(C_2H_5)_2$ | 237.5–238.2 | $C_{14}H_{21}N_3O \cdot H_3PO_4$ | 28.39 | 28.52 | 12.17 | 11.92 |
| 2 | $NC_5H_{10}$ [a] | 198.0–198.7 | $C_{14}H_{19}N_3O \cdot H_3PO_4$ | 28.55 | 28.60 | 12.24 | 12.05 |
| 2 | $NC_6H_{12}$ [b] | 192.5–194.0 | $C_{15}H_{21}N_3O \cdot H_3PO_4$ | 27.43 | 27.50 | 11.76 | 11.56 |
| 2 | $NC_7H_{14}$ [c] | 193.5–195.5 | $C_{16}H_{23}N_3O \cdot H_3PO_4$ | 26.40 | 26.10 | 11.31 | 11.19 |
| 3 | $NC_5H_{10}$ [a] | 202.1–203.3 | $C_{15}H_{21}N_3O \cdot H_3PO_4$ | 27.43 | 27.83 | 11.76 | 11.60 |
| 3 | $NC_6H_{12}$ [b] | 214.8–216.7 | $C_{16}H_{23}N_3O \cdot H_3PO_4$ | 26.40 | 26.40 | 11.31 | 11.20 |
| 3 | $NC_4H_8O$ [d] | 190.5–192.2 | $C_{14}H_{19}N_3O_2 \cdot H_3PO_4$ | 27.28 | 27.52 | 11.69 | 11.55 |

[a] $NC_5H_{10}$ = 1-piperidyl.
[b] $NC_6H_{12}$ = 2-methyl-1-piperidyl.
[c] $NC_7H_{14}$ = 2,6-dimethyl-1-piperidyl.
[d] $NC_4H_8O$ = 4-morpholinyl.

Additional 4-amino-2-(tertiary-aminoalkoxy) benzonitriles which can be prepared according to the foregoing procedures include the following: 4-amino-2-[3-(1-pyrrolidyl)propoxy]benzonitrile; 4 - amino - 2 - [2 - (2,5 - dimethylpyrrolidyl)ethoxy]benzonitrile; 4 - amino - 2 - (4-dimethylaminobutoxy)benzonitrile; 4-amino-2 - [2 - (di - n - butylamino)ethoxy]benzonitrile; 4 - amino - 2 - [3 - (4 - methyl - 1 - piperidyl)propoxy]benzonitrile; 4 - amino - 2- [2 - (3 - ethyl - 1 - piperidyl)ethoxy] - benzonitrile; 4 - amino - 2 - [3 - (2 - methyl - 1 - pyrrolidyl) propoxy]benzonitrile; and the like.

(3) *4-alkylamino- and 4-hydroxyalkylamino-2-(tertiary-aminoalkoxy)benzonitriles*

These compounds were produced by alkylation of the corresponding 4 - amino - 2 - (tertiary-aminoalkoxy)benzonitriles described above. This alkylation was run preferably by reductive alkylation procedures as illustrated in the following examples.

4 - n - Butylamino - 2 - (2 - diethylaminoethoxy)benzonitrile was prepared as follows: To a hot stirred mixture of 20 g. of 4-amino-2-(2-diethylaminoethoxy)benzonitrile, 22.5 g. of zinc dust, 21.2 g. of glacial acetic acid and 100 ml. of dry benzene was added 7.5 g. of n-butanal (n-butyraldehyde) dissolved in 25 ml. of dry benzene over a fifteen minute period. After the mixture had been stirred for one hour, an additional 1 ml. of n-butanal was added and stirring continued for an additional fifteen minutes. The zinc acetate was filtered off and washed with hot dilute acetic acid and benzene. The cooled filtrate was made basic to litmus with concentrated ammonium hydroxide, the benzene layer was separated and the aqueous solution was extracted three times with benzene. After the combined benzene layer and extracts had been dried over anhydrous potassium carbonate, the benzene was removed by distilling in vacuo, yielding, as a mobile yellow oil, 4-n-butyl-amino-2-(2-diethylaminoethoxy)benzonitrile.

This oily product was converted into its monohydrochloride salt as follows: It was dissolved in isopropanol and the resulting solution was treated with an excess of ethereal hydrogen chloride, whereupon a precipitate readily formed. The precipitate was collected, washed with cold isopropanol and recrystallized from absolute ethanol-ethyl acetate. There was thus obtained, as cottony white needles, 4-n-butylamino-2-(2- diethylaminoethoxy) - benzonitrile mono-hydrochloride, M. P. 210.2–211.0° C. (cor.) [dried at 80° C. in vacuo].

Anal.—Calcd. for $C_{17}H_{27}N_3O \cdot HCl$: C, 62.67; H, 8.36; $N_D$, 12.90; Cl, 10.90. Found: C, 62.72; H, 8.47; $N_D$, 12.95; Cl, 10.76.

When the above procedure is followed but using 4-hydroxybutanal or 5-hydroxypentanal in place of n-butanal, the resulting products are 4 - (4 - hydroxybutylamino) - 2 - (2 - diethylaminoethoxy) benzonitrile and 4 - (5 - hydroxyamylamino) - 2 - (2 - diethylaminoethoxy) benzonitrile, respectively.

When the above procedure is followed but using 4 - amino - 2 - (2 -diethylamino - 1 - propoxy)benzonitrile (H) or 4 - amino - 2 - (3-dimethylamino-2-propoxy)-benzonitrile (I), shown above, in place of 4-amino-2-(2-diethylaminoethoxy)-benzonitrile, the resulting product is 4 - n - butylamino - 2 - (2 - dimethylamino-1 - propoxy)benzonitrile (J) or 4 - n - butylamino - 2 - (3 - diethylamino - 2 - propoxy)-benzonitrile (K) having the following respective formulas

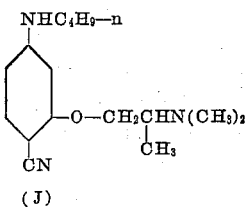
(J)

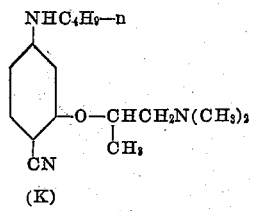
(K)

4 - n - Butylamino - 2 - [2 - (2 - methyl - 1-piperidyl)ethoxy]benzonitrile was prepared following the above procedure but using 15.0 g. of 4 - amino - 2 - [2 - (2 - methyl - 1 - piperidyl) ethoxy]benzonitrile, 15.2 g. of zinc dust, 14.3 g. of glacial acetic acid, 150 ml. of dry benzene and 5.0 g. of n-butanal. The product, 4-n-butylamino - 2 - [2 - (2 - methyl - 1 piperidyl) ethoxy]benzonitrile, was obtained as a thick, viscous, pale orange oil. The phosphate salt of this product was prepared by dissolving about 14 g. of the oil in 100 ml. of hot ethyl acetate and treating the solution with a solution of 6.5 g. of 85% phosphoric acid in 25 ml. of acetone. The phosphate precipitated as a thick, orange-yellow oil. Ether was added to the mixture which was then chilled. The supernatant liquid was separated from the oil by decantation and the oil was taken up in 100 ml. of acetone, whereupon the phosphate salt crystallized. To this mixture was added 100 ml. of ethyl acetate and the resulting mixture was chilled. The solid product that separated was recrystallized by dissolving it in about 100 ml. of water, filtering and diluting the filtrate to a volume of about 450 ml. with absolute ethanol. There was thus obtained, after drying at 100° C. and 0.01 mm. for four hours, 4-n-butylamino-2-[2-(2-methyl-1-piperidyl)ethoxy]benzonitrile phosphate, m. p. 194.4–195.3° C. (cor.).

Anal.—Calcd. for $C_{19}H_{29}N_3O \cdot H_3PO_4$: $N_D$, 10.16; $H_3PO_4$, 23.17. Found: $N_D$, 10.11; $H_3PO_4$, 23.28.

When the above procedure is followed but using, in place of 4-amino-2-[2-(2-methyl-1-piperidyl)ethoxy]benzonitrile, 4 - amino - 2-[3-(1 - piperidyl)propoxy]benzonitrile, 4 - amino - 2 - [2 - (2,6 - dimethyl - 1 - piperidyl)-ethoxy]benzonitrile or 4 - amino - 2 - [2 - (4-morpholinyl)ethoxy]benzonitrile, there is obtained, in the form of their phosphates, 4-n-butylamino - 2 - [3 - (1 - piperidyl)propoxy] benzonitrile, 4 - n - butylamino - 2 - [2 - (2,6-dimethyl - 1 - piperidyl)ethoxy]benzonitrile or 4 - n - butylamino - 2 - [2 - (4 - morpholinyl) ethoxyl-benzonitrile, respectively.

4-n-Amylamino-2-[2-(2-methyl-1-piperidyl)-ethoxy]benzonitrile was obtained, as a viscous orange-yellow oil, when the above procedure was followed but using 10.0 g. of 4-amino-2-[2 - (2 - methyl -1-piperidyl)ethoxy]benzonitrile, 10.1 g. of zinc dust, 9.5 g. of glacial acetic acid, 4.0 g. of n-pentanal (n-valeraldehyde) and 100 ml. of dry benzene. The phosphate of this compound was prepared by dissolving about 11.7 g. of 4-n-amylamino-2-[2-(2-methyl-1-piperidyl)-ethoxy]benzonitrile in 150 ml. of acetone and adding to the resulting solution a solution of 4 g. of 85% phosphoric acid in acetone. The resulting mixture was diluted with 100 ml. of acetone and 100 ml. of ethyl acetate, and chilled in ice, whereupon there separated a white crystalline precipitate. This precipitate was recrystallized by dissolving it in 250 ml. of boiling ethanol, filtering the solution and adding to the filtrate 150 ml. of hot isopropanol. This recrystallization was repeated. There was thus obtained, after drying for four hours at 100° C. and 0.01 mm., 4-n-amylamino-2-[2-(2-methyl-1-piperidyl)ethoxy]benzonitrile phosphate, M. P. 178.0–179.5° C. (cor.).

Anal.—Calcd. for $C_{20}H_{31}N_3O \cdot H_3PO_4$: $N_D$, 9.83; $H_3PO_4$, 22.93. Found: $N_D$, 9.90; $H_3PO_4$, 22.58.

Alternatively, the foregoing reductive alkylations can be carried out using, in place of zinc dust and glacial acetic acid, hydrogen under pressure in the presence of a hydrogenation catalyst such as platinum.

Other 4-alkylamino- or 4-hydroxyalkylamino-2-(tertiary-aminoalkoxy)benzonitriles which can be prepared according to the above procedures using the appropriate alkanal or hydroxyalkanal and 4 - amino-2-(tertiaryaminoalkoxy)benzonitrile include the following: 4-n-butylamino-2-[3-(1-pyrrolidyl)propoxy]benzonitrile; 4-(6-hydroxyhexylamino) - 2 - (2,5-dimethylpyrrolidyl)ethoxy]benzonitrile; 4-(3-hydroxy-1-butylamino)-2-(4-dimethylaminobutoxy)benzonitrile; 4 - (3 - hydroxypropylamino) - 2-[2-(di-n-butylamino)ethoxy]benzonitrile; 4-n-propylamino-2-[3-(4-methyl-1-piperidyl)-propoxy]benzonitrile; 4 - isobutylamino-2-[2-(3-ethyl-1-piperidyl)ethoxy] - benzonitrile; 4 - n - hexylamino-2-[3-(2- methyl - 1-pyrrolidyl)propoxy]benzonitrile; and the like.

Alternatively, the 4-alkylamino- and 4-hydroxyalkylamino - 2-(tertiary-aminoalkoxy)benzonitriles of our invention can be prepared by direct alkylation of the corresponding 4-amino compounds. This mode of alkylation is illustrated by heating 4-amino-2-(2-diethylaminoethoxy)benzonitrile with methyl iodide, ethyl bromide, 2-hydroxyethyl bromide, n-propyl iodide, n-butyl bromide or 5-hydroxypentyl chloride in the presence of a hydrogen halide acceptor such as potassium carbonate to yield, respectively, 4-methylamino-2-(2-diethylaminoethoxy)benzonitrile, 4-ethylamino-2-(2-diethylaminoethoxy)benzonitrile, 4 - n-propylamino-2-(2 - diethylaminoethoxy)benzonitrile, 4 - (2-hydroxyethylamino) - 2 - (2 -diethylaminoethoxy)-benzonitrile, 4-n-butylamino-2-(2-diethylaminoethoxy)benzonitrile or 4 - (5-hydroxyamylamino)-2-(2-diethylaminoethoxy)benzonitrile.

We claim:

1. A compound having the formula

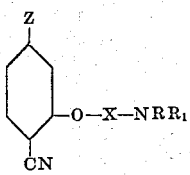

where Z is a member of the group consisting of nitro, amino, lower alkylamino and lower hydroxyalkylamino, X is a lower alkylene radical whose two free valence bonds are on different carbon atoms and $NRR_1$ is a member of the group consisting of lower dialkylamino, 1-piperidyl, (lower alkylated)-1-piperidyl, 1-pyrrolidyl, (lower alkylated)-1-pyrrolidyl and 4-morpholinyl.

2. A compound having the formula

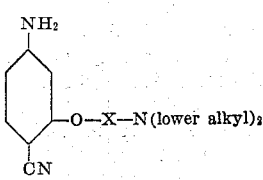

where X is a lower alkylene radical whose two free valence bonds are on different carbon atoms.

3. A compound having the formula

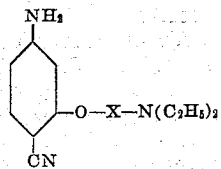

where X is a lower alkylene radical whose two free valence bonds are on different carbon atoms.

4. A compound having the formula

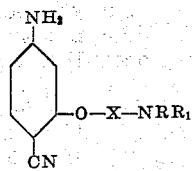

where X is a lower alkylene radical whose two free valence bonds are on different carbon atoms and $NRR_1$ is a 1-piperidyl radical.

5. A compound having the formula

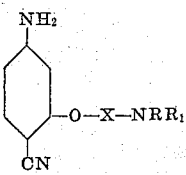

where X is a lower alkylene radical whose two free valence bonds are on different carbon atoms and $NRR_1$ is a (lower alkylated)-1-piperidyl radical.

6. A compound having the formula

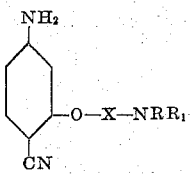

where X is a lower alkylene radical whose two free valence bonds are on different carbon atoms and $NRR_1$ is a 2-methyl-1-piperidyl radical.

7. A process for the preparation of a compound having the formula

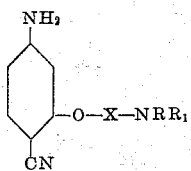

where X is a lower alkylene radical whose two free valence bonds are on different carbon atoms and $NRR_1$ is a member of the group consisting of lower dialkylamino, 1-piperidyl, (lower alkylated)-1-piperidyl, 1-pyrrolidyl, (lower alkylated)-1-pyrrolidyl and 4-morpholinyl, which comprises treating the corresponding 4-nitro-2-(tertiary-aminoalkoxy)benzonitrile with a reducing agent.

8. A process for the preparation of a 4-amino-2 - (dialkylaminoalkoxy)benzonitrile having the formula

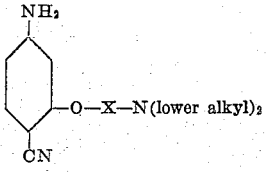

where X is a lower alkylene radical whose two free valence bonds are on different carbon atoms, which comprises treating the corresponding 4-nitro-2-(dialkylaminoalkoxy)benzonitrile with a reducing agent.

9. A process for the preparation of a 4-amino-2-(diethylaminoalkoxy)benzonitrile having the formula

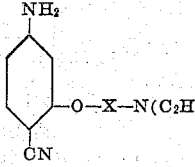

where X is a lower alkylene radical whose two free valence bonds are on different carbon atoms, which comprises treating the corresponding 4- nitro-2-(diethylaminoalkoxy)benzonitrile with a reducing agent.

10. A process for the preparation of a 4-amino-2-(tertiary-aminoalkoxy)benzonitrile having the formula

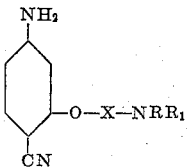

where X is a lower alkylene radical whose two free valence bonds are on different carbon atoms and $NRR_1$ is a 1-piperidyl radical, which comprises treating the corresponding 4-nitro-2-(tertiary-aminoalkoxy)benzonitrile with a reducing agent.

11. A process for the preparation of a 4-amino-2-(tertiary-aminoalkoxy)benzonitrile having the formula

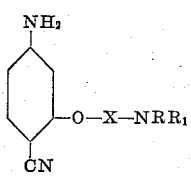

where X is a lower alkylene radical whose two free valence bonds are on different carbon atoms and $NRR_1$ is a (lower alkylated)-1-piperidyl radical, which comprises treating the corresponding 4-nitro-2-(tertiary - aminoalkoxy) - benzonitrile with a reducing agent.

12. A process for the preparation of a 4-amino-2-(tertiary-aminoalkoxy)benzonitrile having the formula

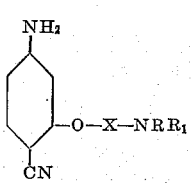

where X is a lower alkylene radical whose two free valence bonds are on different carbon atoms and $NRR_1$ is a 2-methyl-1-piperidyl radical, which comprises treating the corresponding 4-nitro-2-(tertiary-aminoalkoxy)benzonitrile with a reducing agent.

13. 4 - Amino-2-(2 - diethylaminoethoxy)benzonitrile.

14. 4 - Amino - 2-(3 - diethylaminopropoxy) benzonitrile.

15. 4- Amino-2-[2 - (1-piperidyl)ethoxy]benzonitrile.

16. 4 - Amino-2-[3-(1-piperidyl)propoxy]benzonitrile.

17. 4 - Amino - 2 - [2-(2-methyl-1-piperidyl) ethoxy]benzonitrile.

RAYMOND O. CLINTON.
STANLEY C. LASKOWSKI.

No references cited.